July 18, 1967  J. DECHENTREITER  3,331,199
MACHINE FOR THE LOADING OF CROP
Filed March 23, 1966
3 Sheets-Sheet 1
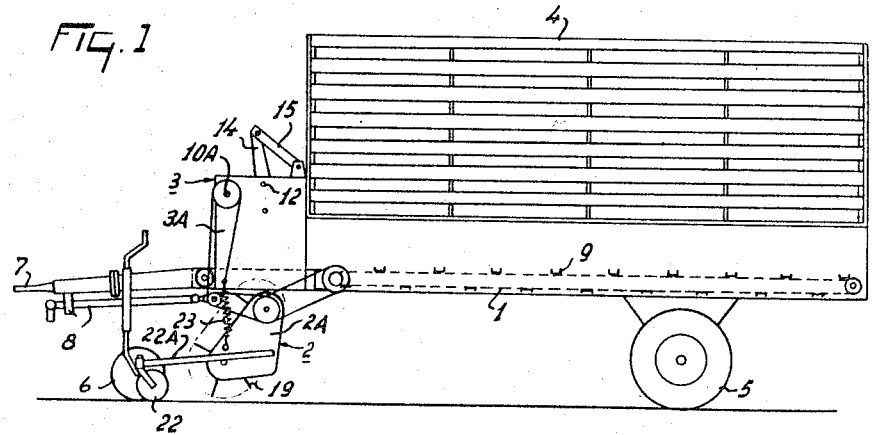
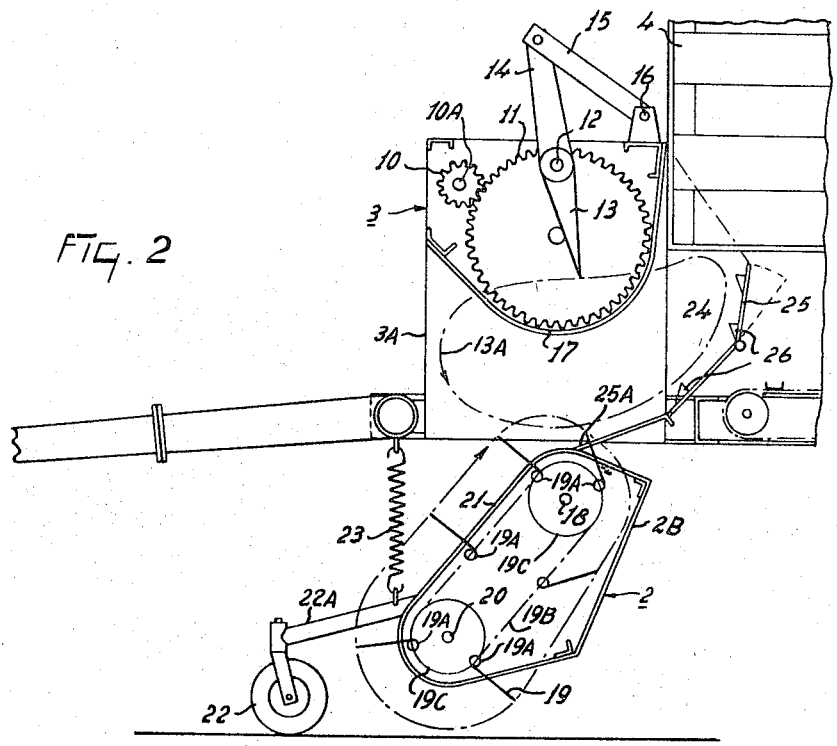
INVENTOR.
JOSEF DECHENTREITER
BY
Mason, Mason & Albright
Attorneys

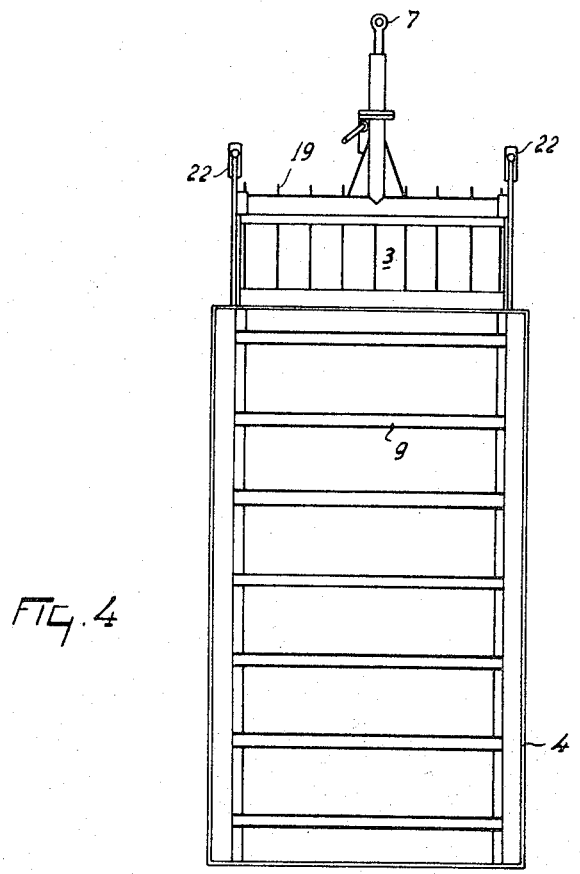

United States Patent Office 3,331,199
Patented July 18, 1967

3,331,199
MACHINE FOR THE LOADING OF CROP
Josef Dechentreiter, Bavaria, Germany
Filed Mar. 23, 1966, Ser. No. 551,817
Claims priority, application Netherlands, May 27, 1963, 293,274
9 Claims. (Cl. 56—364)

This application is a continuation-in-part of U.S. Ser. No. 367,719, filed May 15, 1964, now abandoned. The invention relates to a machine for the loading of crop comprising a frame, a pick-up apparatus and a tined conveyor device cooperating with the pick-up apparatus by means of which the crop picked up from the ground by the pick-up apparatus is pushed onto the load-carrying platform of the machine. The extremities of the tines are moved in a kidney-shaped path as seen in FIGURE 2 so that the leading portion of the path is in receiving relation to the crop pick-up apparatus. The trailing portion of the kidney-shaped path is rearwardly and upwardly with respect to the leading portion of the path.

In accordance with the invention the tines of the conveyor device are pivotally coupled with a driving member adapted to rotate about an axis of rotation extending transversely of the longitudinal direction of the machine, each tine being adapted to rotate about a pivotal axis extending parallel to the axis of rotation and being coupled with the frame by means of a coupling rod, which is adapted to turn both with respect to the frame and with respect to the tine about axes extending parallel to said axis of rotation. This provides a simple mechanism for controlling the tines so that the crop can be effectively pushed by the pushing member into the charging space of the trailer.

A further object of the invention is to provide a machine of the aforesaid kind, in which the crop is not damaged when it is stowed onto the load-carrying platform.

In accordance with the invention this can be achieved by providing a mechanism for guiding the tines of the conveyor device, the arrangement being such that the free end of a tine, viewed in a direction normal to the plane in which a tine is adapted to move, moves over part of its path in which it is in contact with the crop over a given distance at least substantially in a horizontal direction, which movement changes into an at least substantially vertical movement, after which, when the highest point of the path is reached, where the tine starts withdrawing from the crop, it moves slightly in downward direction.

With known machines the pick-up apparatus is usually formed by a rotating drum. The disposition of the pushing member is affected in this case by the diameter of the drum.

An object of the invention is to provide a structure in which the pushing member can be arranged at any desired level.

In accordance with the invention this can be achieved by forming the pick-up device by an endless, tined belt which is guided along two shafts lying one above the other, the lower shaft, viewed in the direction of travel in operation, being located in front of the upper shaft.

A further object of the invention is to provide a machine of the kind set forth, in which the crop conveyed by the catchers of the pick-up member is taken over effectively by the tines of the pushing member.

In accordance with the invention this is achieved by causing the path followed by the free ends of the catchers of the pick-up member to intersect, in a side view, the path covered by the free ends of the tines of the pushing member.

The invention has further for its object to provide a simple construction of said machine, which pushes the crop into the charging space in a satisfactory manner preferably at an oblique angle between the vertical and horizontal directions.

In accordance with the invention this is achieved by providing only in the lower portion of the ascending front wall of the machine an opening through which the crop is conveyed by means of the pushing member into the charging space.

The available charging space can at the same time be used effectively.

For a better understanding of the invention and to show how the same may be readily carried into effect, reference will be made by way of example to the accompanying drawings in which:

FIG. 1 is a side elevation of the machine.

FIG. 2 is a sectional view taken in the center of the pick-up apparatus and the conveyor device.

FIG. 4 is a plan view of the machine.

Figure 3:
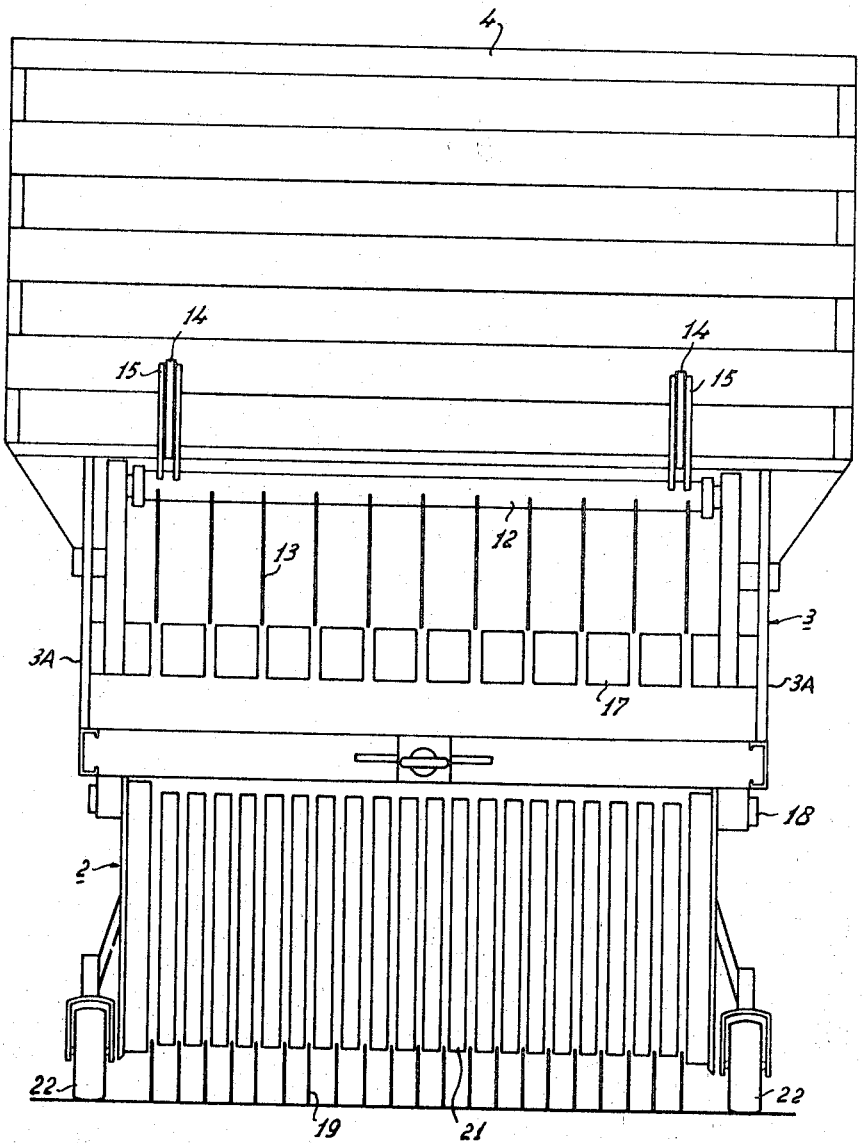
FIG. 3 is a front view of the machine, the driving and the vertical screening hood of the conveyor device being omitted.

The machine shown in FIG. 1 is a trailer comprising a frame 1, to which are attached a pick-up apparatus 2 and a conveyor device 3. The trailer has a crop receiving area surrounded by walls 4 of laths or gauze and is supported by ground wheels 5 and wheel 6, adjustable in a direction of height and supporting the front end of the trailer, when the latter is not coupled with a tractor. With the aid of a draw hook 7 the trailer can be attached to a tractor, while the power take-off shaft of the tractor can be coupled with an intermediate shaft 8. The intermediate shaft 8 drives through transmissions of known structure the pick-up apparatus 2 and the conveyor device 3. For discharging the trailer a roller-floor or scraper-floor 9 can be driven through the intermediate shaft so that during the discharge the crop leaves the trailer on the rear side.

From FIG. 2 it will be seen that the conveyor device comprises a small gear wheel 10, the teeth of which engage the teeth of a large gear wheel 11. On either side of the trailer such a set of gear wheels 10 and 11 is provided. The gear wheels 10 are fastened to a shaft 10A, which is journalled in the plates 3A and can be driven through the intermediate shaft 8. A tube 12, located between the gear wheels 11, is rotatably journalled at its end on the circumference of the gear wheels 11 and a number of tines 13 is provided on the shaft 12. Preferably a single row of tines are used in the conveyor device. The tube 12 has furthermore two levers 14, which are hinged through bars 15 to pivotal points 16, which are stationary with respect to the frame. There is furthermore provided a number of strips 17, which, viewed from aside, extend over part of their length along the lower side of the gear wheels 11.

The pick-up apparatus 2 is driven through the shaft 18, about which an elevator with resilient tines 19 is adapted to rotate. Near the ground the elevator is guided around a shaft 20. Shafts 18 and 20 are mounted on side plate 2A with shaft 18 also being carried by device 3. The tines of this elevator are controlled in known manner and move on the front side of the trailer over a given distance in a substantially straight line between strips 21 which extend from back plate 2B.

The tines are mounted on beams 19A which extend parallel to the shafts 18 and 20. The beams are fastened to the chains 19B, which are taken around the sprocket wheels 19C mounted on the shafts 18 and 20.

On the front side of the pick-up apparatus there are furthermore provided swivel wheels 22 mounted on arms 22A which extend from side plates 2A. Between the pick-up apparatus and the frame there is fastened a spring 23. Above the pick-up apparatus there is arranged the conveyor duct 24, having a wall 25. This wall is provided with retaining members 26. Part of the wall 25 can be displaced in the upper portion, as is shown in FIG. 2 in broken lines, or be removed. In any event it is important that the principal direction of the crop being fed into the receptacle be oblique or at an angle of about 15–75° from the horizontal.

The wall 25 is situated opposite to the wall formed by the strips 17. The wall 25 and the wall formed by the strips 17 function as a conveyor duct for crop as it is borne into the receptacle portion of the trailer. In the front end of the wall 25 joining the pick-up apparatus are provided elongated slots at 25A through which the tines 19 move. The ends of said elongated slots constitute stops for the tines, so that, as will be seen from the FIGURE, the tines are guided so that they are withdrawn from the crop approximately at right angles to the direction of movement of the crop pushed in the conveyor duct. The conveyor duct is thus located below the forward wall 4 of the receptacle.

FIG. 3 is a front view of the strips 17 and 21 of the conveyor device and of the pick-up apparatus respectively. These strips have the shape of a U, viewed from the side, roughly. FIG. 3 shows furthermore that both the pick-up apparatus and the conveyor device extend substantially throughout the width of the trailer. FIG. 4 shows the draw bar, which is formed at the front end by a single cylindrical beam so that the elevation of the crop can be satisfactorily supervised from the seat of the tractor.

When the trailer is moved by means of a tractor across the field, the pick-up apparatus 2, driven by the power take-off shaft of the tractor, will lift the crop, which may lie in swaths, and displace it towards the conveyor device 3. The tines 13 of the conveyor device 3, which is also driven by the power take-off shaft will be moved between the strips 17 approximately sideways of the direction of movement of the crop and push the crop towards the trailer, after which the tines 13 are withdrawn from the crop again in a direction approximately sideways of the direction of movement of the crop. At a given distance in front of the conveyor duct, the tines 13 are pushed downwardly between the strips 17 and the free ends of the tines thus move approximately vertically downwards. Then the tines are guided so that they move over part of their path approximately in a horizontal direction, so that they intersect the path described by the tines 19 of the pick-up apparatus and that a satisfactory take over of the crop by the tines of the conveyor device is insured.

During their movement in the conveyor duct, the ends of the tines 13 gradually move more in a vertical direction and at the highest point of their path in the conveyor duct they return downward along a slightly oblique line until they arrive completely at the side of the strips 17, serving as scrapers, remote from the crop. When the tines 13 are withdrawn from the crop between the strips 17 the angle between the side of the tines facing the crop and the side of the ascending portions of the strips 17 facing the crop gradually increases, while at the same time the tines constantly extend downwardly in the conveyor duct. This has inter alia the advantage that the crop is damaged to a lesser extent and is compressed smoothly. Since with the aid of the conveyor device large quantities of crop are pushed gradually into the charging space, the crop is prevented from clogging excessively. The path described by the free ends of the tines is indicated by the line 13A in FIG. 2. The retaining members 26 in the compression duct 24 prevent the crop from moving backwards relative to duct 24. The wall 25 can be displaced or removed for different kinds of crop and different conditions. In operation and during transport the wheel 6 is moved upwards. For transport purposes the pick-up member 2 can be tilted upwards about the shaft 18 and locked in a position above the grounds by any appropriate means as will occur to those skilled in the art. The spring 23 facilitates the tilting operation and furthermore provides the advantage that the swivel wheels 22 can follow the unevenness of the ground, in operation, with a low pressure.

When the trailer is loaded, it can be discharged by driving the conveyor 9. If desired, the trailer may be employed as a manure broadcaster. In this case, in general, the conveyor 9 will be driven more slowly than for discharging green fodder and the like.

I claim:

1. A crop-carrying wagon for the loading and transporting of crop, including green crop and hay, comprising a frame, a crop-carrying receptacle attached to said frame, a crop pick-up apparatus connected to the forward part of said wagon, and a tined conveyor device carried by said wagon adjacent said pick-up apparatus, said tined conveyor device including a driving member adapted to rotate about a substantially horizontal axis of rotation extending across the forward part of said wagon, a plurality of tines eccentrically coupled with said driving member to rotate therewith about said axis of rotation, and connecting means connected on one end to said wagon and on the other end coupled to said tines, passage means extending from said pick-up apparatus to said receptacle, the front side of said receptacle being located above said passage means, said passage means obliquely communicating with the interior of said receptacle in an oblique upwardly direction, the extremities of said tines being moved in a kidney-shaped path wherein the leading portion of said path is in receiving relation to said crop pick-up apparatus and the trailing portion of said path is rearwardly and upwardly with respect to said leading portion, whereby said tines push crop from said pick-up apparatus into said receptacle in a direction between the vertical and the horizontal, said receptacle having a movable floor for moving crop from the front part of said wagon to the rear, said loading wagon being connectable to a tractor and having driving means for coupling to operate said movable floor, said conveyor device and said crop pick-up apparatus.

2. A loading wagon for loading crop lying on the ground, including green crop and hay, comprising a frame supported by ground wheels, a crop-carrying receptacle mounted on said frame, a pick-up apparatus coupled to said wagon, a conveyor passageway extending between said pick-up apparatus and said crop-carrying receptacle, a conveyor device carried by said wagon adjacent said pick-up apparatus, said conveyor device comprising a row of tines extending transversely to the direction of travel for moving crop through said conveyor passageway and retaining members for the crop in said conveyor passageway, the extremities of said tines being moved in a kidney-shaped path wherein the leading portion of said path is in receiving relation to said crop pick-up apparatus and the trailing portion of said path is rearwardly and upwardly with respect to said leading portion, said receptacle having a movable floor for moving crop from the front part of said wagon to the rear, said loading wagon being connectable to a tractor and having drive means for coupling to operate said movable floor, said conveyor device and said crop pick-up apparatus.

3. A loading wagon for loading and transporting crop, including green crop and hay, comprising a frame, a crop-carrying receptacle having a front wall and a movable floor attached to said frame, a pick-up apparatus coupled to said wagon frame, a conveyor passageway extending from said pick-up apparatus to said receptacle, a conveyor device carried by said wagon adjacent said pick-up apparatus, said conveyor device comprising one row of tines which are pivotable with respect to a driving member about a pivot axis which extends parallel to an axis of rotation about which said driving member is rotatable, coupling means being pivotally coupled with said tines and with coupling points on said wagon, the coupling means being situated, when seen in a direction parallel to said axis of rotation, adjacent the path described by said pivot axis during rotation, said receptacle having a front side and said coupling points being near and in front of said front side when seen in a direction parallel to said axis of rotation, and said coupling means being further situated at one side of a vertical plane through said coupling points with said receptacle being situated at the other side of said plane, the extremities of said tines being moved in a kidney-shaped path wherein the leading portion of said path is in receiving relation to said crop pick-up apparatus and the trailing portion of said path is rearwardly and upwardly with respect to said leading portion.

4. A loading wagon for loading and transporting crop, including green crop and hay, comprising a frame, a crop-carrying receptacle attached to said frame, said receptacle having a movable floor, a pick-up apparatus coupled to said wagon, a conveyor passageway extending from said pick-up apparatus to said receptacle, a conveyor device carried by said wagon above said pick-up apparatus, driving means comprising two gear wheels spaced apart from one another, a tine support mounted eccentrically on said gear wheels, a row of tines attached to said tine support, arm means attached to said tine support and coupling means pivotally connected to said arm means and to said wagon, said arm means being positioned at the forward end of said wagon, the extremities of said tines being moved in a kidney-shaped path wherein the leading portion of said path is in receiving relation to said crop pick-up apparatus and the trailing portion of said path is rearwardly and upwardly with respect to said leading portion, said loading wagon being connectable to a tractor and having drive means for coupling to power said movable floor, conveyor device and said pick-up apparatus.

5. A loading wagon as claimed in claim 4, wherein said gear wheels are driven by gear wheels having smaller diameters.

6. A loading wagon as claimed in claim 5, wherein when seen in plan view, said smaller gear wheels are situated at one side of the axis of rotation of the other gear wheels and said coupling means on the wagon are situated at the other side of said axis of rotation.

7. A loading wagon for loading crop, including green crop and hay, comprising a frame, crop-handling means attached to said frame, said crop-handling means leading into an opening at the forward end of a crop-carrying receptacle, a crop pick-up apparatus included in said handling means adjacent said opening, a conveyor device carried by said frame above said pick-up apparatus, said conveyor device and said pick-up apparatus having scraper strips, a conveyor passageway extending between the strips of said pick-up apparatus and the strips of said conveyor device, tine elements included in said pick-up apparatus for moving crop substantially upwardly into said conveyor passageway, tines included in said conveyor device passing between the scraper strips of said conveyor device for moving crop in said conveyor passageway, the tines of said conveyor device being pivotally coupled to a driving member, said receptacle having a front side at the end of said conveyor passageway, the path of movement of said tines extending partly within said conveyor passageway, the path of said tines in said passageway being first upwardly through said opening in said receptacle to the extreme limit of movement and then downwardly, said receptacle having a movable floor to move crop received from said conveyor passageway, the extremities of said tines being moved in a kidney-shaped path wherein the leading portion of said path is in receiving relation to said crop pick-up apparatus and the trailing portion of said path is rearwardly and upwardly with respect to said leading portion.

8. A loading wagon as claimed in claim 7, wherein said coupling points are situated at a higher level than the upmost point of the path of the extremities of the tines.

9. A loading wagon for loading crop, including green crop and hay, comprising a frame, a crop-handling means attached to said frame, said crop-handling means leading into an opening at the forward end of a crop-carrying receptacle, a crop pick-up apparatus included in said handling means adjacent said opening, a conveyor device carried by said frame above said pick-up apparatus, said conveyor device and said pick-up apparatus having scraper strips, a conveyor passageway extending between the strips of said pick-up apparatus and the strips of said conveyor device, tine elements included in said pick-up apparatus for moving crop substantially upwardly into said conveyor passageway, tines included in said conveyor device passing between the scraper strips of said conveyor device for moving crop within said conveyor passageway, the tines of said conveyor device being pivotally coupled to a driving member, said receptacle having a front side at the end of said conveyor passageway, the path of movement of said tines extending partly within said conveyor passageway, the path of said tines in said passageway being first upwardly to the extreme limit of movement and then downwardly, said passageway communicating obliquely upwardly with said receptacle whereby said crop is moved obliquely upwardly into said receptacle, said receptacle having a movable floor to move crop received from said conveyor passageway, the extremities of said tines being moved in a kidney-shaped path wherein the leading portion of said path is in receiving relation to said crop pick-up apparatus and the trailing portion of said path is rearwardly and upwardly with respect to said leading portion.

References Cited
UNITED STATES PATENTS

| | | | |
|---|---|---|---|
| 2,729,047 | 1/1956 | Cheatum | 56—344 |
| 2,775,339 | 12/1956 | Cadier et al. | |
| 2,839,981 | 6/1958 | Harstick et al. | 56—341 X |
| 3,252,277 | 5/1966 | Weichel | 56—345 |

ABRAHAM G. STONE, *Primary Examiner.*

ANTONIO F. GUIDA, *Examiner.*